US006922755B1

(12) United States Patent
Safranek et al.

(10) Patent No.: US 6,922,755 B1
(45) Date of Patent: Jul. 26, 2005

(54) DIRECTORY TREE MULTINODE COMPUTER SYSTEM

(75) Inventors: Robert J. Safranek, Portland, OR (US); Eric N. Lais, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 09/507,261

(22) Filed: Feb. 18, 2000

(51) Int. Cl.[7] ............................................. G06F 13/00
(52) U.S. Cl. ...................... 711/144; 711/131; 711/146
(58) Field of Search ........................ 711/141, 144, 145, 711/146, 131

(56) References Cited

U.S. PATENT DOCUMENTS

| | | | | |
|---|---|---|---|---|
| 5,588,131 A | * | 12/1996 | Borrill ........................ | 711/146 |
| 5,590,307 A | * | 12/1996 | McClure ...................... | 711/131 |
| 5,655,102 A | * | 8/1997 | Galles ......................... | 711/150 |
| 5,802,578 A | | 9/1998 | Lovett ......................... | 711/147 |
| 5,900,015 A | * | 5/1999 | Herger et al. ................ | 711/141 |
| 5,900,020 A | * | 5/1999 | Safranek et al. ............. | 711/167 |
| 6,041,376 A | * | 3/2000 | Gilbert et al. ............... | 710/108 |
| 6,226,714 B1 | * | 5/2001 | Safranek et al. ............. | 711/119 |

OTHER PUBLICATIONS

James Archibald, et al., ACM Transactions on Computer Systems, vol. 4 No. 4, Nov. 1986, "Cache Coherence Protocols: Evaluation Using a Multiprocessor Simulation Model".

MESI Protocol, at URL: http://www.disi.unige.it/person/DelzannoG/Cache Protocol/mesi.html.

Ivan Tving, Master Thesis DTH ID-E 579., Feb. 2, 1994, Multiprocessor Interconnection Using SCI.

* cited by examiner

*Primary Examiner*—Reba I. Elmore
(74) *Attorney, Agent, or Firm*—Klarquest Sparkman Campbell Leigh & Whinston; Pryor Garnett; Abdy Raissinia (57) ABSTRACT

A multinode, multiprocessor computer system with distributed shared memory has reduced hardware and improved performance by providing a directory free environment. Without a directory, nodes do not track where cache lines are stored in caches on other nodes. In two-node systems, cache lines are implied to be either on the local node or cached at the remote node or both. Thus, if a local node has a cache miss it is implied that the other node in the system has the cache line. In another aspect, the system allows for "silent rollouts." In prior distributed memory multiprocessor systems, when a remote node has capacity limitations, it must overwrite (i.e., rollout) a cache line and report to the home node that the rollout occurred. However, the described system allows the remote node to rollout a cache line without reporting to the home node that the rollout occurred. Such a silent rollout can create timing problems because the home node still believes the remote node has a shared copy of the cache line. To solve the timing problems and ensure forward progress, if the remote node requests a cache line and receives an invalidate message, it issues a request for an exclusive copy of the cache line. By requesting an exclusive copy, the remote node is guaranteed to obtain the desired cache line and forward progress is achieved.

19 Claims, 9 Drawing Sheets

DIRECTORY TREE MULTINODE COMPUTER SYSTEM

FIELD OF THE INVENTION

This invention relates generally to multinode computer systems. More particularly, this invention relates to a multinode computer system with distributed shared memory that eliminates the use of a directory to track cache copies of lines and/or that allows for silent rollouts of lines on a remote node.

BACKGROUND

Multiprocessor computers by definition contain multiple processors that can execute multiple parts of a computer program or multiple programs simultaneously. In general this multiprocessor computing executes computer programs faster than conventional single processor computers, such as personal computers (PCs), that execute the parts of a program sequentially. The actual performance advantage is a function of a number of factors, including the degree to which parts of a program can be executed in parallel and the architecture of the particular multiprocessor computer at hand.

Multiprocessor computers may be classified by how they share information among the processors. Shared-memory multiprocessor computers offer a common memory address space that all processors can access. Processes within a program communicate through shared variables in memory that allow them to read or write to the same memory location in the computer. Message passing multiprocessor computers, on the other hand, have a separate memory space for each processor. Processes communicate through messages to each other.

Multiprocessor computers may also be classified by how the memory is physically organized. In distributed memory computers, the memory is divided into modules physically placed near each processor. This placement provides each processor with faster access time to its local memory. By contrast, in centralized memory computers, the memory is physically located in just one location, generally equally distant in time and space from each of the processors. Both forms of memory organization use high-speed cache memory in conjunction with main memory to reduce execution time.

Multiprocessor computers with distributed shared memory are often organized into nodes with one or more processors per node. Also included in the node is local memory for the processors, a remote cache for caching lines obtained from memory in other nodes, and logic for linking the node with other nodes in the computer. A processor in a node communicates directly with the local memory and through the remote cache to obtain data. For example, if the desired data is in the local memory, a processor obtains the data directly from local memory. But if the desired data is stored in memory in another node, the processor must access its remote cache to obtain the data. A cache hit occurs if the data has been obtained recently and is presently stored in the cache. Otherwise a cache miss occurs, and the processor must obtain the desired data from the local memory in another node through the linking logic. Accessing local memory is faster than obtaining data located in another node. Consequently, such distributed shared memory systems are termed Non-Uniform Memory Access systems (NUMA).

Data coherency is maintained among the multiple caches and memories of a multiprocessor computer through a cache coherency protocol, such as the protocol described in the Scalable Coherent Interface (SCI) (IEEE 1596). The multinode computer systems require a local cache directory (also called a directory) that holds information relating to whether other nodes have copies of lines stored in cache. There are several types of directories used in different multinode systems, including full-mapped and chained directories. In a full-mapped directory, information about all lines in all caches resides in a directory. There are two main approaches for implementing the full-mapped directory. Either a central directory contains duplicates of all cache directories, or a bit vector called the present flag vector is associated with each cache line. With the central directory, all cache directories have to be searched for each memory access. With the bit vector for a cache line, each node of the system is associated with one bit of the vector. If a bit is set, the node corresponding to this bit has a copy of the line.

In the chained directory, instead of having a centralized directory containing information about all cached lines, the directory information is distributed over the system as a linked list. Linked lists are commonly used to maintain cache coherency by identifying each node that contains a copy of the cache line of interest. Thus, the directory entry for a cache line is a common reference point containing the state and a pointer to a head of a sharing list. Likewise, each node on the sharing list contains a pointer field used for maintaining the list. This pointer field either holds a reference to the next cache that has a copy of the line or it contains a link terminator indicating that this node has the tail of the list for the line in question. This approach reduces the storage space due to the distributed sharing list. SCI is an example of a cache protocol that uses a chained directory.

Regardless of the type of directory used, a remote node may have a "capacity miss." A capacity miss occurs when the remote node's cache is full and cannot store more lines. To make additional room in the cache, a cache line may be overwritten (also called a "roll out" or "eviction"). When rolling out a line, the remote node informs the home node of the rollout so that the local directory on the home node can be updated. If the remote node contains the only copy of the line, then the remote node transfers the line to the home node so that it is stored in main memory (often called a "write back"). Some Symmetric Multiprocessor (SMP) systems have silent rollouts of lines. With silent rollouts, the remote node rolls out cache lines that are shared without reporting the rollout to the home node. The silent rollouts are possible in SMP systems because all nodes share a common bus and, as a result, modified data responses can be "snarfed" meaning that the memory also reads a copy of the cache line and writes it back to main memory.

In order to increase the speed and reduce costs of multinode systems, it is desirable to simplify existing architectures and the protocol used for inter-node communication. In particular, for applications that only require a two-node system, the hardware and software can be simplified while maintaining a high degree of performance. However, it is not readily apparent what modifications can be made to multinode systems to reduce costs.

An object of the invention, therefore, is to reduce costs in a multinode computer system by reducing the complexity of the protocol and/or hardware used to communicate between the nodes. Another object of the invention is to ensure that the multinode computer system maintains forward progress of requests for lines.

SUMMARY

In one aspect of a multinode computer system, the local cache directory is eliminated. Prior protocols used in multinode systems, such as the SCI protocol, require a local cache directory to be present. By eliminating the directory, communication between nodes is simplified and hardware costs are reduced. In two-node systems according to the invention, lines are implied to be either on the local node, shared between the nodes, or cached at the remote node. Thus, if a local node does not have a valid copy, it is implied that the other node in the system has the valid copy.

Another aspect of the described system is a "silent rollout." In previous distributed memory multiprocessor systems, when a remote node has capacity limitations, it must overwrite (i.e., rollout) a cache line and report to the home node that the rollout occurred. However, the present system allows the remote node to rollout a cache line without reporting to the home node that the rollout occurred. Such a silent rollout can create timing problems because the home node still believes the remote node has a shared copy of the cache line.

Another aspect of the described system concerns using a state machine to solve timing problems caused by silent rollouts in an unordered network. After a silent rollout, if the remote node attempts to obtain a shared copy of the cache line at about the same time that the home node attempts to write the line, the home node may send the remote node an invalidate message instead of the requested line. A remote node cannot discern the difference between an invalidation for a previously rolled out line or for the data response still pending. This scenario can occur repeatedly, preventing the remote node from achieving forward progress. To ensure forward progress, if the remote node requests a line and receives an invalidate message, the state machine ensures that a request for an exclusive copy of the line is issued by the remote node. By requesting an exclusive copy, the remote node is guaranteed to obtain the desired line and forward progress is achieved. Thus, even when the remote node only desires a shared copy of the line, it may request an exclusive copy to ensure forward progress. Such timing problems may occur because the system is an unordered network, meaning that responses may be received out of order with respect to their corresponding requests.

The foregoing and other objects, features, and advantages of the invention will become more apparent from the following detailed description, which proceeds with reference to the following drawings.

DETAILED DESCRIPTION

Figure 1:
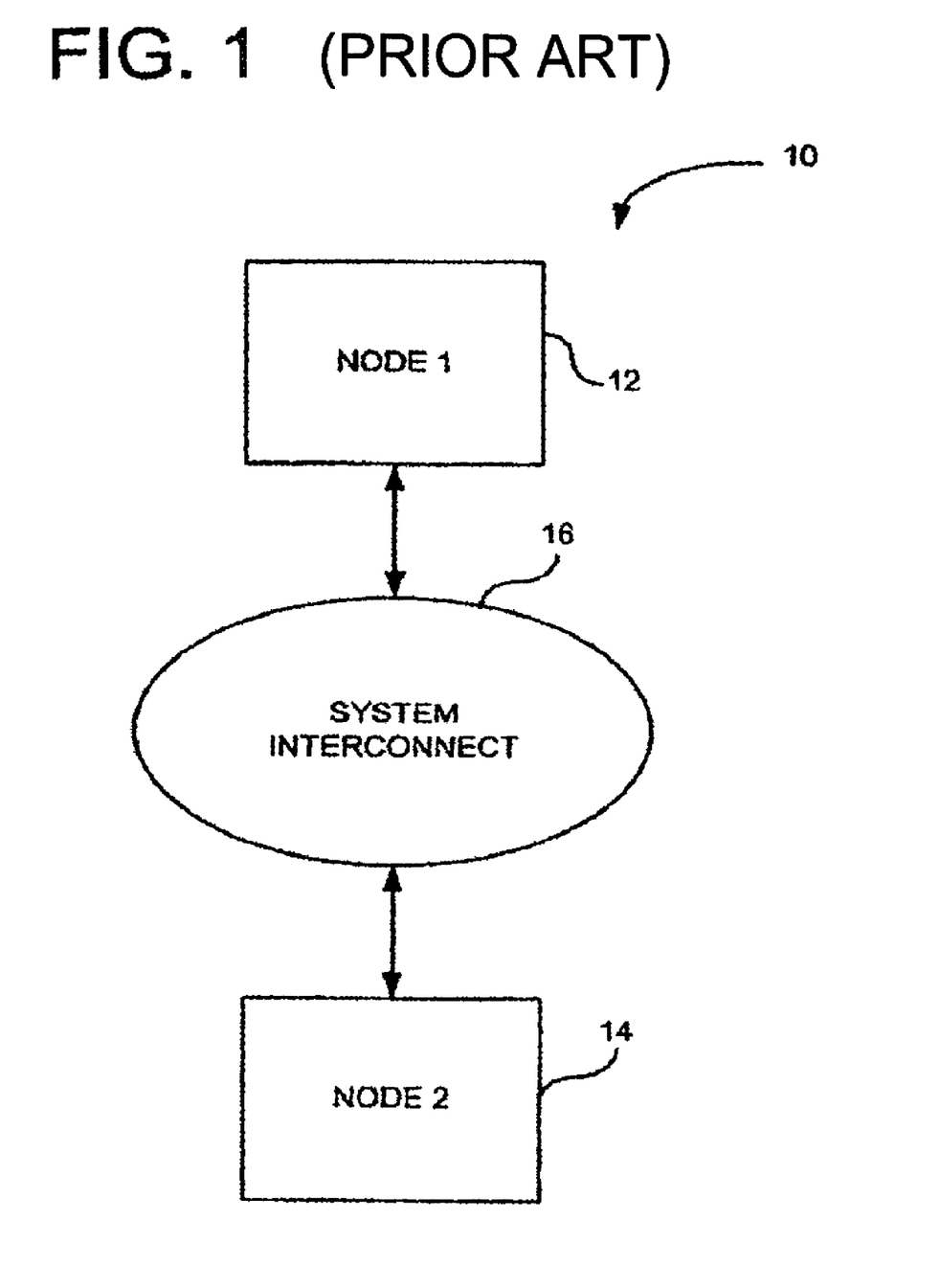
FIG. 1 is a block diagram of a multinode, multiprocessor computer system in accordance with the invention.

FIG. 1 is a block diagram of a multinode, multiprocessor computer system 10 in accordance with the invention. System 10 uses a computer architecture based on Distributed Shared Memory (DSM). Two nodes 12 and 14 are shown connected by a system interconnect 16 that permits the nodes to communicate. Specifically, the purpose of interconnect 16 is to allow processors within the nodes to access the memory resident on the other node while maintaining cache coherency. As described further below, the system interconnect 16 uses the Scaleable Coherent Interface (SCI) interconnection mechanism. SCI is an IEEE approved standard, or protocol, well documented in a number of publications including IEEE standard 1596-1992 (2 Aug. 1993). However, some modifications to the SCI protocol are made, as described further below.

Figure 2:
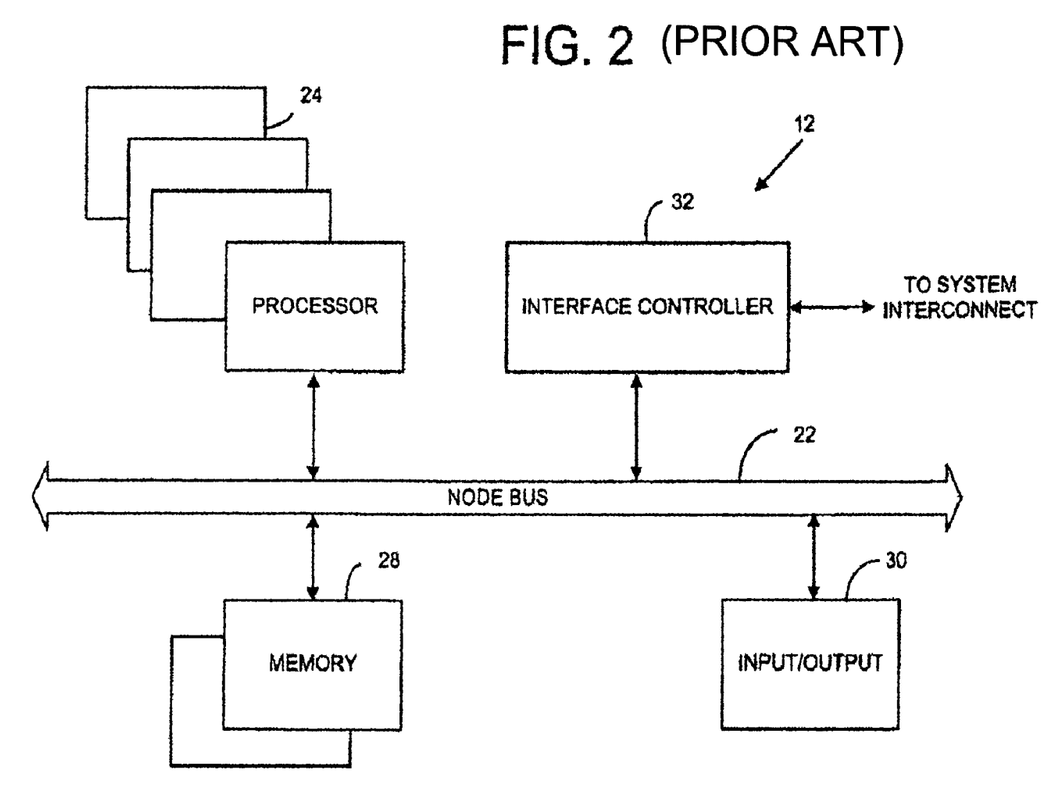
FIG. 2 is a block diagram of one of the nodes of the computer system of FIG. 1.

A block diagram of node 12 of system 10 is shown in FIG. 2. The node includes a conventional symmetrical multiprocessor (SMP) node bus 22 for connecting multiple data processors 24 to local memory 28. For clarity, nodes 12 and 14 may be referred to as home nodes or remote nodes in certain circumstances. A home node is one whose local memory stores a memory block of interest (i.e., the address of the memory block falls within the address range supported by the local memory); all of the other nodes are then remote nodes with respect to that memory block. Additionally, a node may be requesting node or a responding node. A requesting node is one requesting data; a responding node is one furnishing such data. Input/output (I/O) 30, which is also connected to bus 22 connects the node to devices outside computer system 10 for communicating information between the computer system and the outside world. I/O may be of conventional design and includes means for connecting the node (and hence system 10) to personal computers, local area networks, etc., that wish to utilize the power of the multinode computer system. To connect node 12 to the other nodes in the system, the node includes an interface controller 32. The interface controller forms part of system interconnect 16 along with the physical links between nodes and the same devices on the other nodes of the computer system 10. In the present embodiment, interface controller 32 is constructed to allow a processor on one node to access data stored on another node. The system is an unordered network, meaning that responses may be received out of order with respect to their corresponding requests. As described further below, because the system is an unordered network, timing problems may occur.

Figure 3:
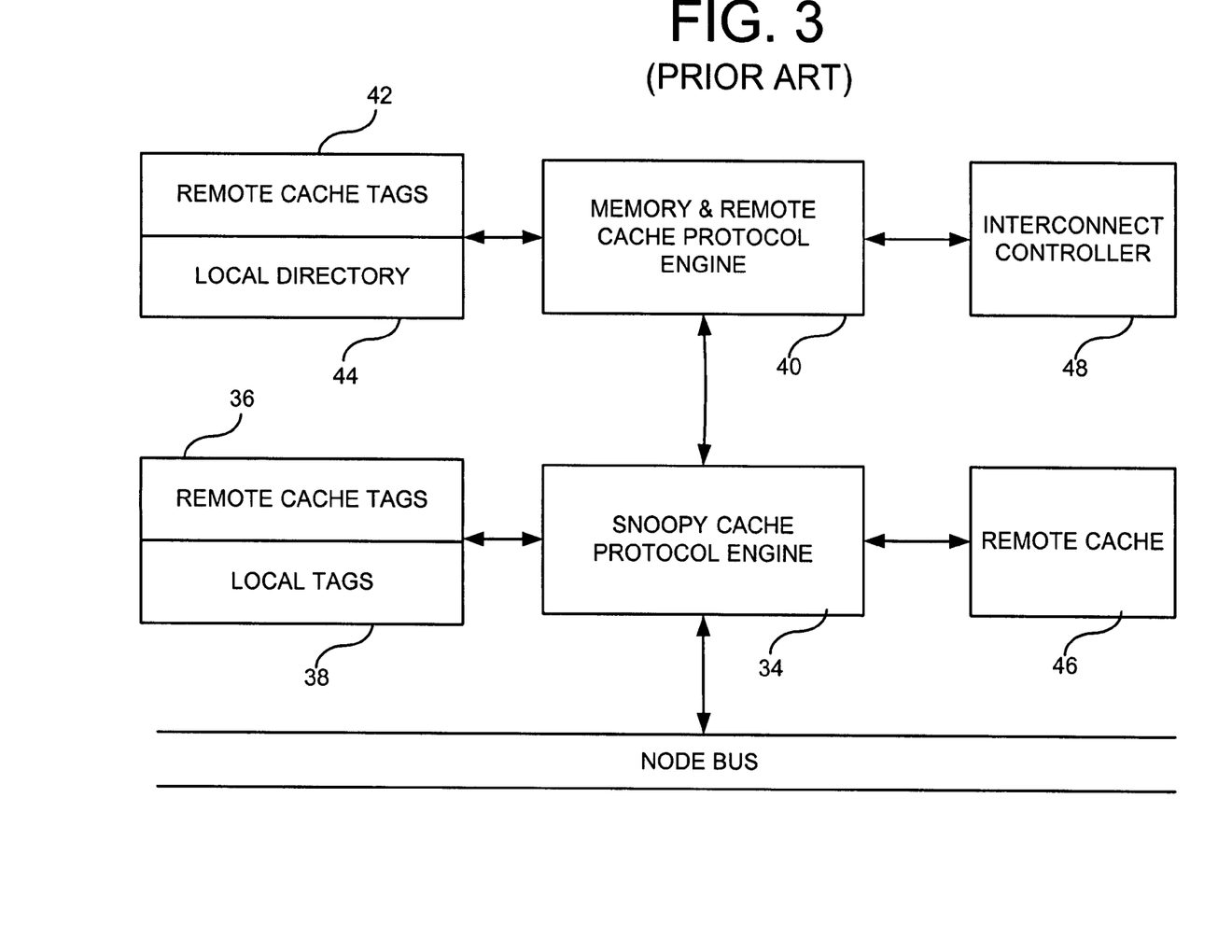
FIG. 3 is a block diagram of a prior art interface controller.

FIG. 3 is a block diagram showing a prior art interface controller 32 in more detail. The interface controller 32 includes a snoopy cache protocol engine 34, storage for remote cache tags 36, and local tags 38, which can be accessed by the snoopy cache protocol engine 34. The interface controller 32 also includes a memory and remote cache protocol engine 40 that has access to a second storage area for remote cache tags 42 and a local directory 44. A remote cache 46 is coupled to the snoopy cache protocol engine 34. The remote cache tags 36, 42 identify cache lines available in remote cache 46. The local tags 38 provide only limited information on whether cache lines are stored in cache on remote nodes and is not considered a directory as described further below. The interface controller 32 also includes an interconnect controller 48.

To maintain coherence among the remote caches in the nodes of the computer system 10, the prior art system of FIG. 3 uses a chained directory scheme defined in the SCI protocol. The chained directory is implemented as a doubly linked sharing list that keeps track of which caches share the same lines. With this sharing list, remote caches can be notified when the lines they share have been changed and, thus, are no longer valid. The memory state and the head of the sharing lists are stored in the local directory 44.

Figure 4:
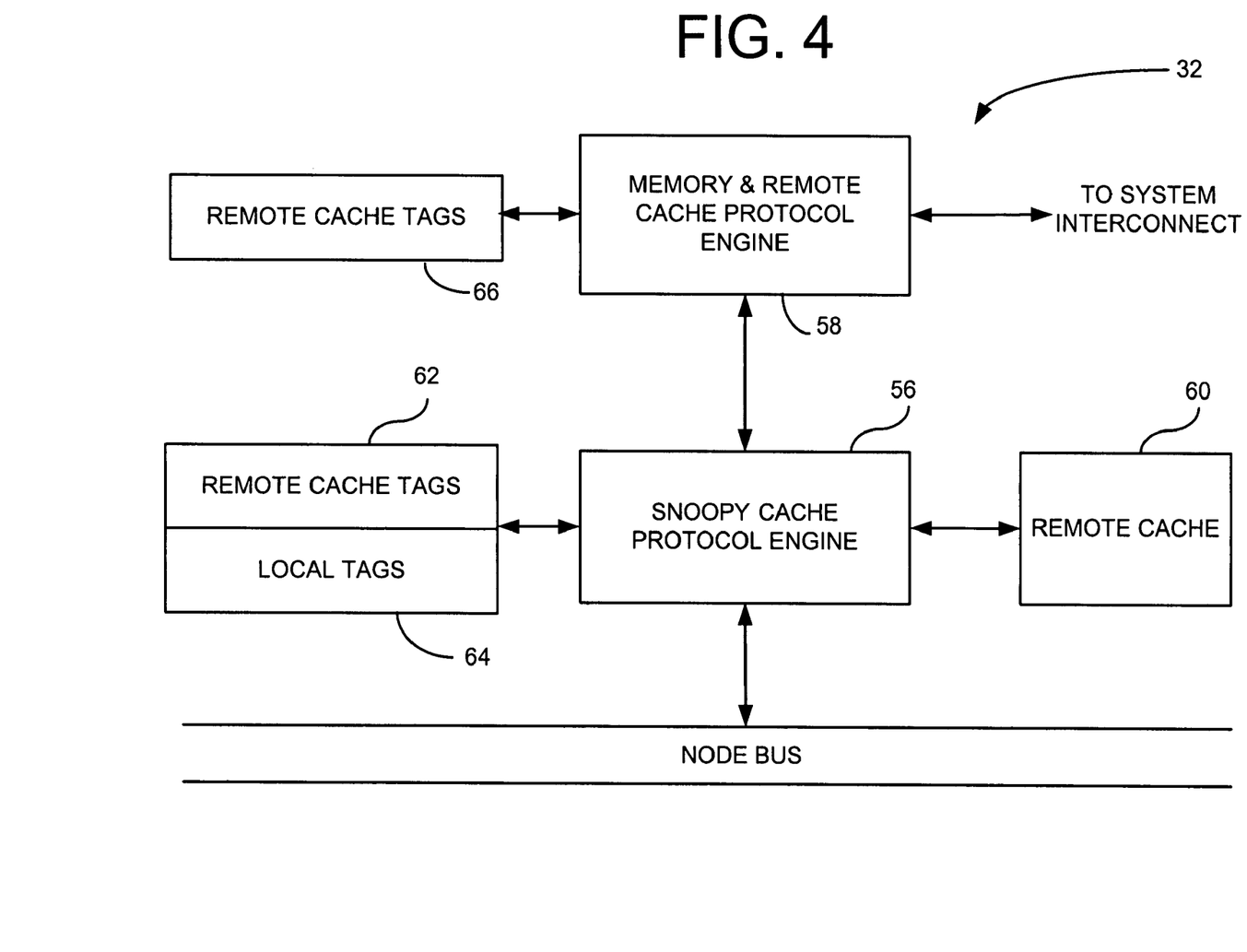
FIG. 4 is a block diagram of an interface controller within the node of FIG. 2, in accordance with the invention.

FIG. 4 shows the interface controller 32 according to the present invention. The interface controller 32 includes a snoopy cache protocol engine 56 and a memory and remote cache protocol engine 58, both of which are similar to those shown in FIG. 3. Additionally, the interface controller includes a remote cache 60, remote cache tags 62 and local tags 64. FIG. 4 differs from FIG. 3 in that the local directory 44 (FIG. 3) is no longer required. Thus, the memory and remote cache protocol engine 58 is only coupled to a remote cache tags 66. Additionally, the interconnect controller 48 (FIG. 3) has been removed and its functionality replaced by a system interconnect, described further below.

The local tags 64 do not provide a directory (e.g., full-mapped directory, chained directory, etc.). Instead, the local tags 64 only store three states: a "home" state indicating that this node has the only valid copy; a "fresh" state indicating that another node in the system has read the line in the past; and a "gone" state indicating that the home node no longer has a valid copy of the line. Thus, in the system of FIG. 4 no directory is used.

Figure 5:
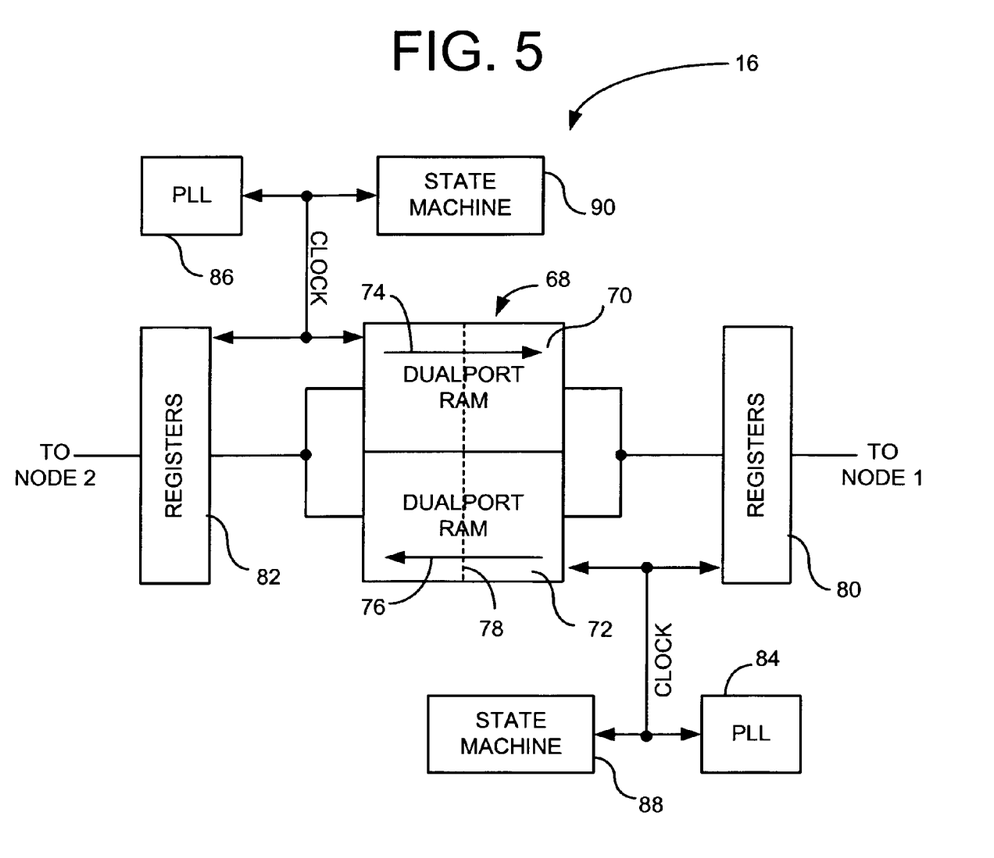
FIG. 5 is a block diagram showing details of the system interconnect of FIG. 1.

FIG. 5 shows the system interconnect 16 as including a dualport RAM 68 having two main sections, 70 and 72. Section 70 is used for requests and responses passed from node 2 to node 1 as indicated by arrow 74. Conversely, section 72 is used for requests and responses passed from node 1 to node 2 as indicated by arrow 76. The dualport RAM 68 is also divided into input and output sections as indicated by dotted line 78. For example, the left side of section 70 is the input section and the right side is the output section. Conversely, the right side of section 72 is the input section and the left side is the output section. Two sets of registers 80 and 82 are coupled to opposing ports on the dualport RAM 68. Two phase-lock loops 84 and 86 supply clocks to registers 80, 82 and the dualport RAM. State machine 88 is coupled to the phase-lock loop 84, the register 80 and the dualport RAM. State machine 90 is coupled to phase-lock loop 86, register 82 and dualport RAM 68. The state machines 88, 90 control the transfer of data in and out of the dualport RAM, as is well understood in the art. Specifically, state machine 88 controls the input and output from the right side of the dualport RAM, while state machine 90 controls the left side of the dualport RAM 68.

Figure 6:
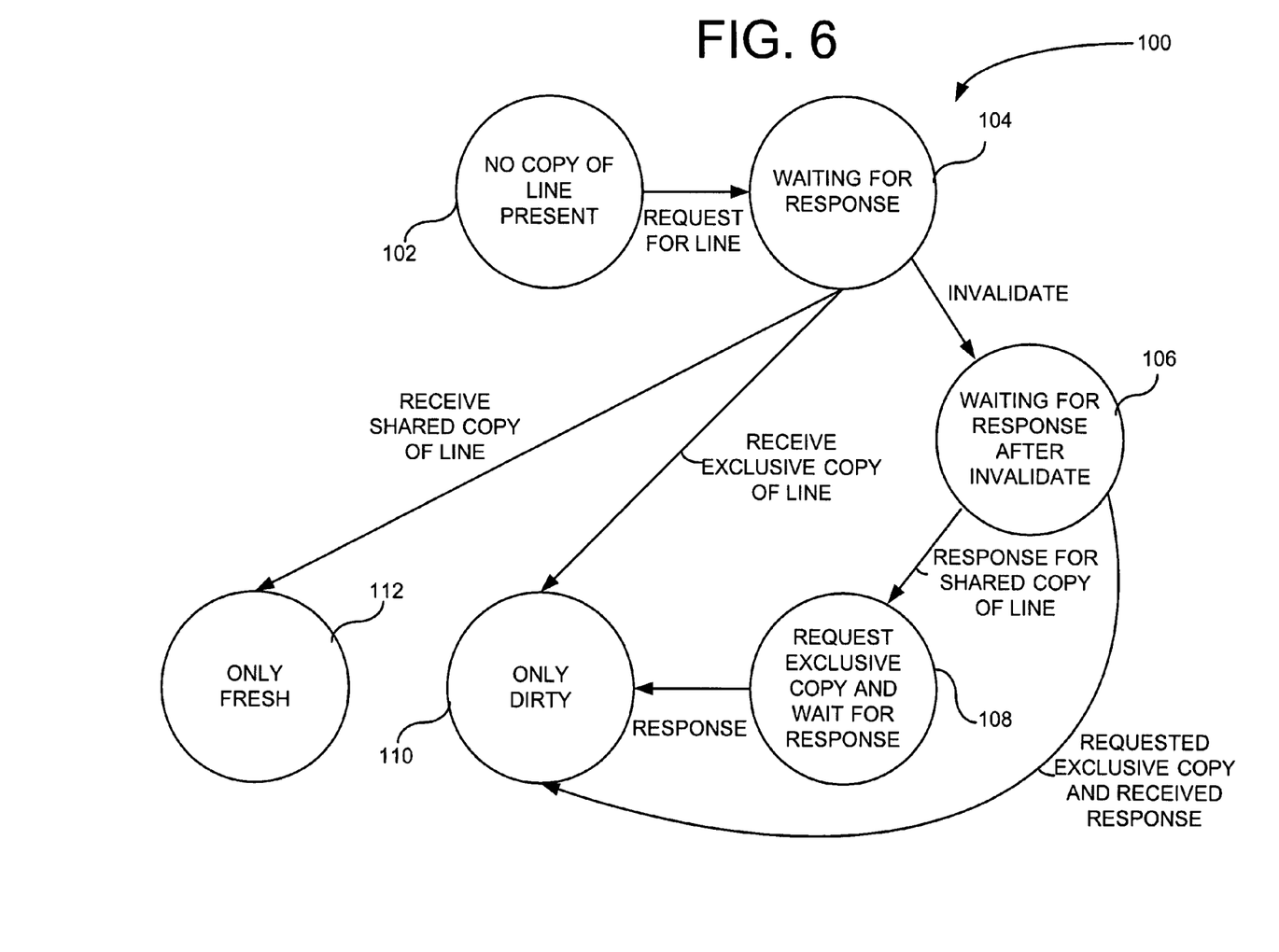
FIG. 6 is a state diagram implemented on a remote node in accordance with the invention for ensuring forward progress after a silent rollout of a cache line.

FIG. 6 shows a state diagram 100 for a state machine executed on the memory and remote cache protocol engine 58 (FIG. 4) on a remote node. The state machine includes six states 102, 104, 106, 108, 110, and 112. In state 102, the memory and remote cache protocol engine 58 has not made any requests for lines that have not already been completed. If a request is made for a line, such as a request for a shared or an exclusive copy (i.e., one that is writable) of a line, the state machine transitions from state 102 to state 104 and waits for a response. There are three state transitions that can be made from state 104. If a line is received from a request for a shared copy of the line, the state machine transitions to the ONLY FRESH state 112 and the remote cache tags 62, 66 are updated to reflect that a shared copy of the line is stored in the remote cache. If while in state 104, an exclusive copy was requested and the line is received from the home node, then the state machine transitions from state 104 to the ONLY DIRTY state 110. Again the remote cache tags 62, 66 are updated to indicate that the cache on the remote node has the only copy of the line. When transitions to either state 110 or 112 occur, the home node updates its local tags to indicate the line is gone or fresh. If while in state 104, an invalidate response is received from the home node, then the state machine transitions to state 106. At this point, to ensure forward progress the state machine determines whether a request for an exclusive copy of the line was already made. If an exclusive copy was already requested then the state machine transitions upon receiving the line from the home node to the ONLY DIRTY state 110. If, on the other hand, a request for a shared line was previously requested from the remote node and the line is received, then the memory and remote cache protocol engine 58 disregards the data response, transitions to the state 108 and issues a second request for an exclusive copy of the line. Once the exclusive copy of the line is received, the state machine transitions from state 108 to the ONLY DIRTY state 110. Thus, if an invalidate message is received when in state 104, the state machine ensures that a request has been made for an exclusive copy of the line so that the remote node request be allowed to complete.

Figure 7:
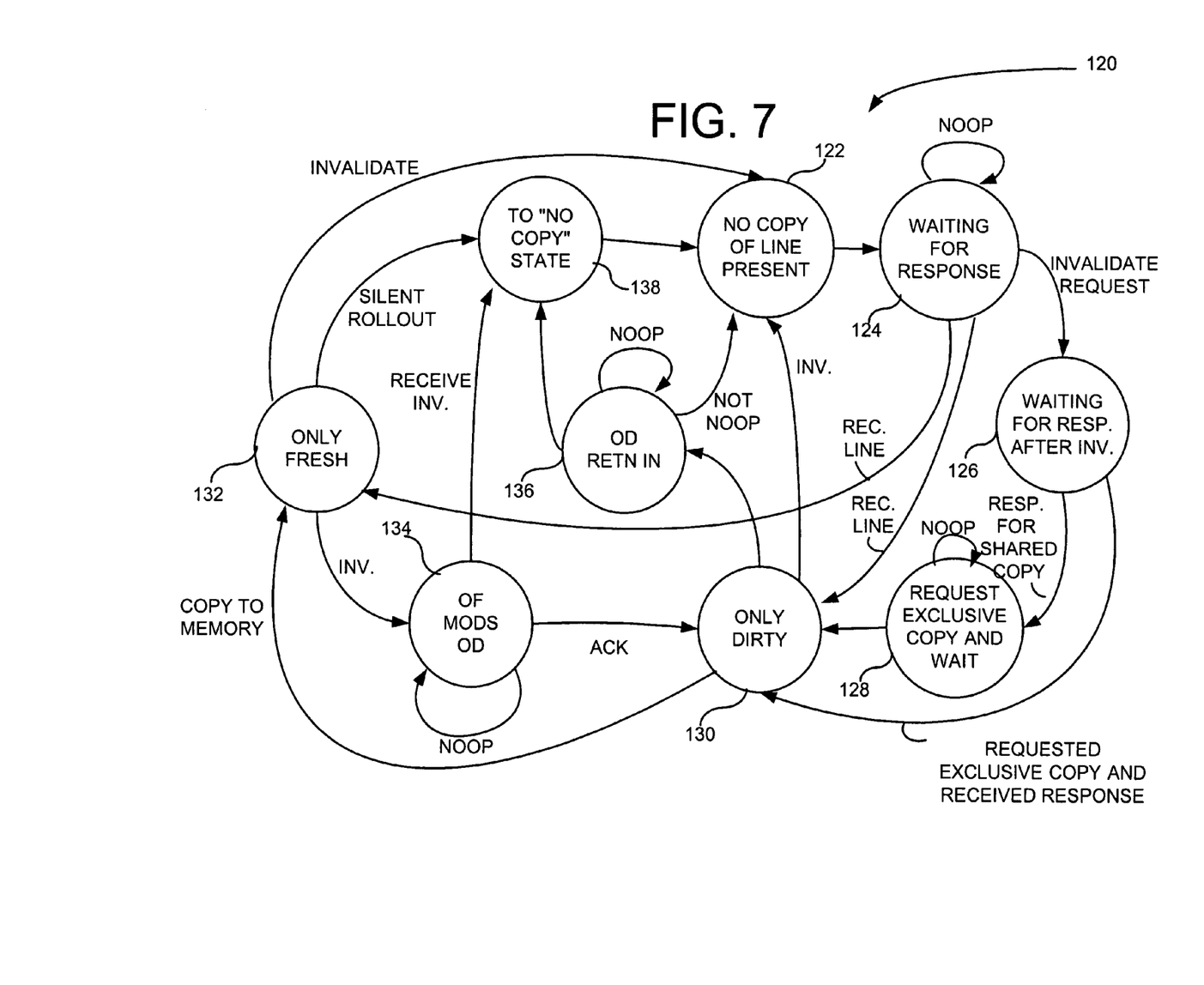
FIG. 7 is a detailed state diagram implemented on a remote node in accordance with the invention for ensuring forward progress after a silent rollout of a cache line.

FIG. 7 shows a more detailed state diagram 120 that operates in the memory and remote cache protocol engine 58. FIG. 7 shows states 122, 124, 126, 128, 130, and 132, which are similar to the same states described in FIG. 6. State 124, 128 show an additional condition called NOOP, which represents that when a negative acknowledgement response is received from the home node, there is no state change. For example, if in state 124 and a NOOP response is received, then that response is disregarded and the state machine remains in state 124. The additional states shown are the "OF_MODS_OD" state 134, a "OD_RETN_IN" state 136 and a "TO_NO_COPY" state 138. The "OF_MODS_OD" state stands for a transition of ONLY FRESH modifying to ONLY DIRTY. This state transition occurs when the remote node invalidates the line because it intends to write a new line. The remote node consequently issues a "list_to_gone" command that transitions the state machine from the ONLY FRESH state 132 to the OF_MODS_OD state 134. If an acknowledge response is received from the home node, the state transitions from the state 134 to the ONLY DIRTY state 130. If a negative acknowledgement is received, then state 134 re-issues the list_to_gone command. If an invalidate command is received, then the state machine transitions from state 134 to state 138.

The transition from the ONLY DIRTY state 130 to the "OD_RETN_IN" (return to invalid) state 136 occurs when the line is rolled out. A rollout occurs when there is a capacity miss in the remote node that causes the remote node to replace a cache line. To perform the rollout from the ONLY DIRTY state 130, the remote node sends the line to the home node so that it can be stored on the home node. In state 136, if a not acknowledge command is received then the request to rollout the line is resent to the home node. If an acknowledge is received, then the state machine transitions to the invalid state 122. If the home node requests a shared copy or an exclusive copy of the line, then the state machine transitions from state 136 to state 138. At that point any response automatically causes a transition from state 138 to state 122.

Figure 8:
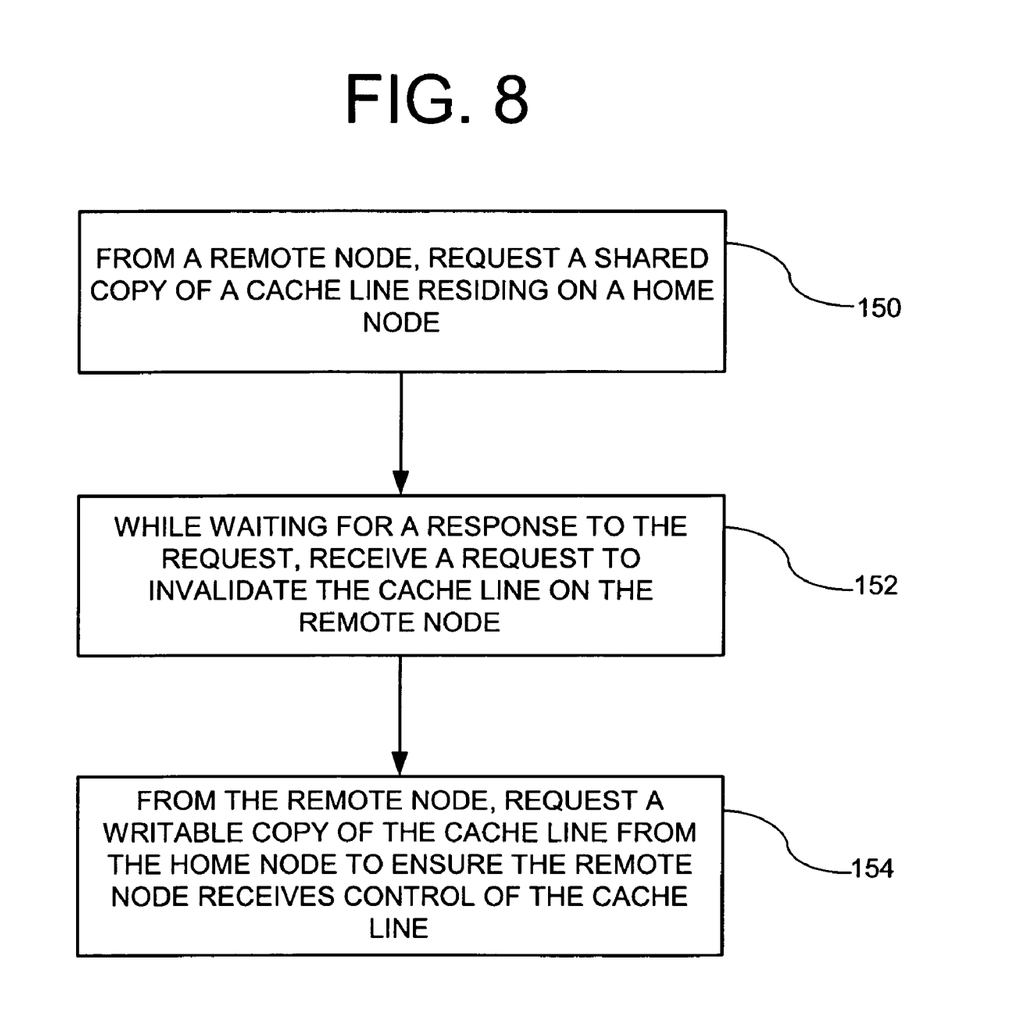
FIG. 8 is a flowchart of a method for ensuring forward progress of a request for a cache line from a remote node.

FIG. 8 shows a flow chart of a method for ensuring forward progress that further describes the operation of the state machine of FIG. 6. In process block 150, a remote node requests a shared copy of the line residing on the home node. In process block 152, while waiting for the response to the remote nodes' request for the line, the remote node receives a request to invalidate the line. This indicates a race condition exists where both the remote node and home node want access to the cache line approximately simultaneously. The home node requires control of the line and, thus, invalidates the line on the remote node. The remote node, on the other hand, is requesting a shared copy of the line.

In process block 154, the remote node automatically requests an exclusive copy of the line from the home node to ensure it receives control of the line. Thus, the remote node requests an exclusive copy of the line even if it originally only requested a shared copy of the line. This ensures forward progress and that the remote node does not receive another invalidate message in response to its request for the line.

Figure 9:
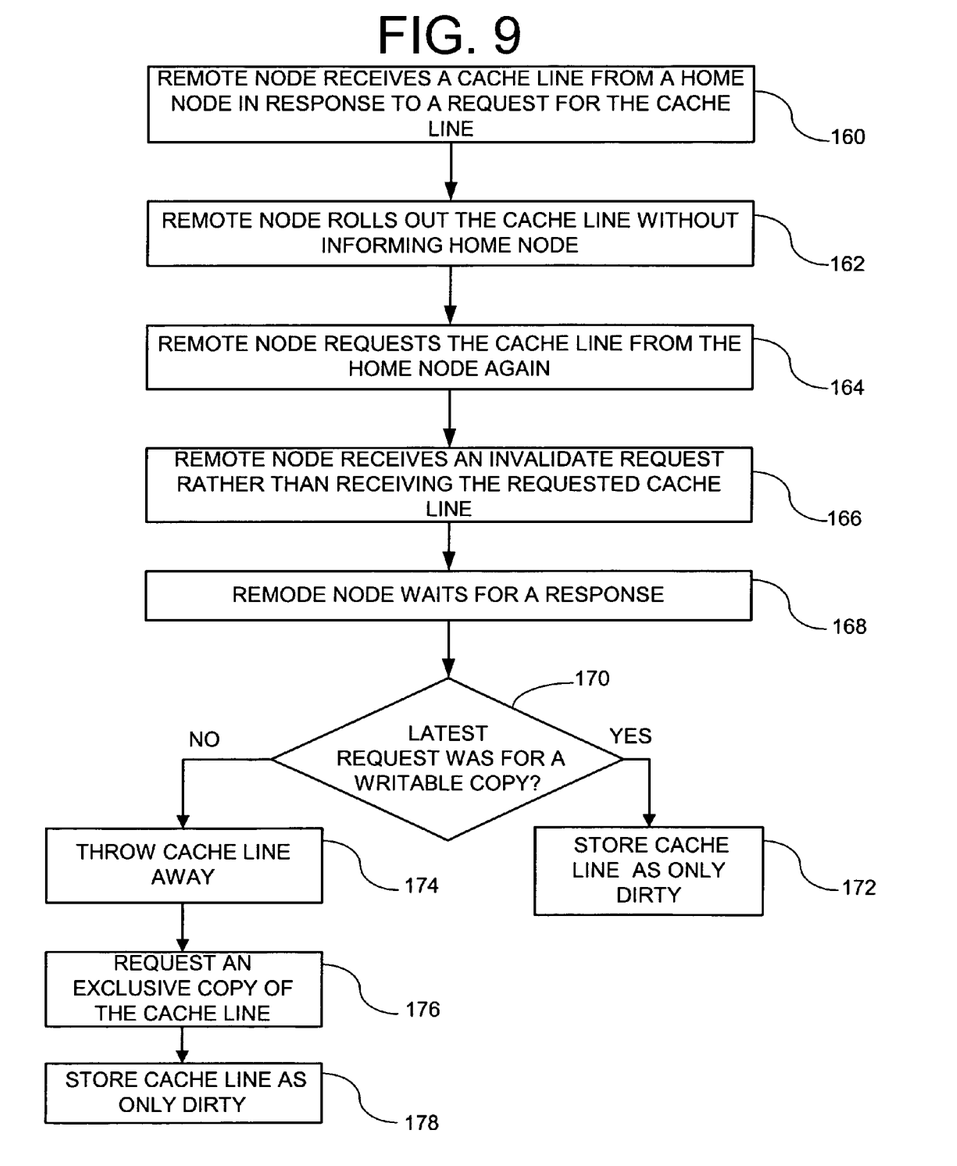
FIG. 9 is a detailed flowchart of a method for ensuring forward progress of a request for a cache line from a remote node.

FIG. 9 shows a more detailed flowchart of how the remote node ensures forward progress. In process block 160, the remote node initially receives the line from the home node in response to a request for the line. This is a normal transaction where the remote node requests the line and receives the line from the home node. In process block 162, the remote node silently rolls out the line without informing the home node. Due to capacity limitations, the remote node required more room in its cache and consequently invalidated and replaced the cache line in question. Due to the absence of a directory, the remote node does not inform the home node that the line was invalidated on the remote node. The ability to perform silent rollouts increases the speed of the system by reducing inter-node communication. In process block 164, the remote node determines that it again needs a copy of the line from the home node. Consequently, the remote node requests the line and waits for a response. In process block 166, the remote node receives an invalidate request rather than receiving the requested line. The invalidate request indicates that the home node is trying to obtain an exclusive copy of the line at around the same time that the remote node is requesting a copy (shared or exclusive). The remote node then waits for the response in process block 168. In decision block 170, a determination is made whether the last request was for an exclusive copy. If so, the data response that is received is automatically stored as an only dirty copy (process block 172), which means the remote node has the only copy of the line. If on the other hand the decision block 170 is in the negative, then the line that was received is disregarded (process block 174) and a request is made for an exclusive copy of the line (process block 176). Once the data response is received, the cache line is stored as only dirty (process block 178).

Having illustrated and described the principles of the illustrated embodiments, it will be apparent to those skilled in the art that the embodiments can be modified in arrangement and detail without departing from such principles. For example, although the invention is described in relation to a two-node system, it may be extended to additional nodes. In such a case, requests can be broadcast to each node rather than sending messages to a specific node. Additionally, although the term "cache line" is described generically, memory space is typically divided into blocks, each block containing some number of successive memory locations. Such blocks of memory are typically referred to as cache lines. A typical cache line may be 64 bytes, but other sizes may be used. Thus, cache lines as described herein may include cache lines of any size memory block and may be stored in memory or remote cache. Still further, elements of the illustrated embodiment shown in software may be implemented in hardware and vice versa.

In view of the many possible embodiments, it will be recognized that the illustrated embodiments include only examples of the invention and should not be taken as a limitation on the scope of the invention. Rather, the invention is defined by the following claims. We therefore claim as the invention all such embodiments that come within the scope of these claims.

We claim:

1. In a multinode computer system with distributed shared memory, a method of ensuring that a remote node receives a copy of a cache line stored on a home node, comprising:
   from a remote node, requesting a shared copy of a cache line that is stored on a home node;
   while waiting for the requested cache line, receiving on the remote node a request to invalidate the cache line; and
   in response to the request to invalidate the cache line, requesting an exclusive copy of the cache line.

2. The method of claim 1, further including storing a shared copy of the cache line on the remote node and rolling out the cache line on the remote node prior to the request for a shared copy of the cache line, without informing the home node of the rollout.

3. The method of claim 1, wherein the remote and home nodes do not use a directory to track the locations of cache lines.

4. The method of claim 1, further including issuing a request for the cache line from a processor on the home node at approximately the same time the request for the shared copy of cache line is received from the remote node.

5. The method of claim 1, further including discarding a response to the request for the shared copy of cache line after receiving the invalidate request.

6. The method of claim 1, further including passing data between the nodes using a system interconnect that includes a dualport RAM controlled by at least one state machine.

7. The method of claim 1, further including providing a state machine in the remote node that upon requesting the cache line, remains in a first pending state;
   if while in the first pending state, the cache line is received, storing the cache line into a cache on the remote node and transitioning to a dirty or fresh state;
   if while in the first pending state, a request to invalidate is received, transitioning to a second pending state; and
   while in the second pending state, upon receiving the cache line, discarding the cache line and issuing the request for an exclusive copy of the cache line.

8. The method of claim 1 wherein the multinode computer system includes multiple processors on each node and the multinode computer system is an unordered network.

9. The method of claim 1 wherein the multinode computer system includes at most two nodes.

10. In a multinode computer system with distributed shared memory, a method of ensuring that a remote node receives a copy of a cache line stored on a home node, comprising:
    storing a copy of a cache line on the remote node, wherein the cache line is a shared copy of the cache line that is also stored on the home node;
    overwriting the cache line on the remote node without informing the home node that the cache line is no longer stored on the remote node;

after overwriting the cache line, requesting a new copy of the cache line be delivered to the remote node again;

receiving, on the remote node, a request to invalidate the cache line before the requested copy of the cache line is received; and issuing a request for an exclusive copy of the cache line so that the remote node can obtain control of the cache line.

11. The method of claim 10 further including:

receiving a response on the remote node for the requested cache line after receiving the invalidate request; and discarding the response on the remote node for the requested cache line.

12. The method of claim 10 further including:

receiving a processor request on the home node for control of the cache line;

in response to the processor request, checking local tags to determine if another node has a shared copy of the cache line; and upon determining that another node has a shared copy, sending the invalidate request to the remote node because the home node was not notified that the remote node has overwritten its copy of the cache line.

13. The method of claim 10 further including receiving on the remote node an exclusive copy of the cache line.

14. A multinode computer system with distributed shared memory that ensures a remote node receives a copy of data stored on a home node, comprising:

a first node having multiple processors, a local memory, and a remote cache, wherein the first node is a home node that stores a memory block of interest;

a second node having multiple processors, a local memory, and a remote cache, wherein the second node is a remote node with regard to the memory block of interest;

a system interconnect coupling the first node to the second node; and a state machine located on the second node, the state machine moving between different states in response to requests made from the second node to the first node and responses to the requests;

the state machine having states such that when an invalidate request is received directly after a request is made for a copy of the memory block of interest, the state machine automatically sends a request for an exclusive copy of the memory block of interest.

15. The multinode computer system of claim 14 wherein the first and second nodes include snoopy cache protocol engines.

16. The multinode computer system of claim 14 wherein the first and second nodes do not use a directory or list of any kind to track the location of cache lines that are stored in cache on another node.

17. The multinode computer system of claim 14 wherein the remote node performs silent rollouts of data.

18. In a multinode computer system with distributed shared memory, a method of ensuring that a remote node receives data efficiently, comprising:

providing a first node having multiple processors, memory and a remote cache, the first node being a home node with respect to a memory block of interest and wherein the first node does not have a cache directory;

providing a second node having multiple processors, memory and a remote cache, the second node being a remote node with respect to the memory block of interest and wherein the second node does not have a cache directory;

receiving a request on the second node from a processor on the second node for the memory block of interest;

checking remote cache on the second node to determine whether the memory block of interest is stored in the remote cache;

if the memory block of interest is not stored in the remote cache, automatically assuming that the memory block of interest is stored on the first node since the second node cannot check a cache directory to determine the location of the memory block of interest; and sending a request to the first node for the memory block of interest.

19. The method of claim 18 further including:

receiving the memory block of interest on the second node; and rolling out the memory block of interest on the second node without informing the first node of the rollout.

* * * * *